CARTONS FOR PROTECTION AND STORAGE OF MAGNETICALLY SENSITIVE MATERIALS

Filed May 13, 1965

INVENTORS:
GILES D. STEPHENS
ROBERT C. MORSINK
BY [signature]
ATTORNEY 3,341,102

CARTONS FOR PROTECTION AND STORAGE OF MAGNETICALLY SENSITIVE MATERIALS

Giles D. Stephens, 4190 Balsam St., Wheat Ridge, Colo. 80033, and Robert C. Morsink, 8672 W. Brittany Drive, Littleton, Colo. 80120

Filed May 13, 1965, Ser. No. 455,504
7 Claims. (Cl. 229—3.5)

The invention for which a patent is solicited is a carton for protection and storage of magnetically sensitive materials. The object of this invention is to provide a device to be used for the storage, shipment, and protection of magnetically and electrically sensitive materials and components which are adversely affected by random magnetic and electro-magnetic fields and forces. This container (box) device is specifically related to the extended and long-term permanent protection of magnetic tapes, discs, drums, and other data media utilized in computers, recorders, and electronic devices. The container is also designed for other applications where shielding of or from magnetic disturbances is necessary.

Magnetic tapes, drums, and related electronic recording materials are subject to erasure, partial loss, data drop-out, distortion, and transfer when placed in or near intense electrical and/or magnetic fields or forces for short periods of time, or exposed to low energy fields or forces for longer time periods. Such magnetic disturbances can be generated from electrical appliances, thunderstorms, radio and television transmitters, inverters, transformers, batteries, and many other types of private and commercial power generating equipment. Since prior determination of all electrical and/or magnetic forces that may exist or come into existence in a given area is impossible, it is the express purpose of this container to effectively shield any item placed within it from any electrical and/or magnetic force. When feasible, the device may be utilized to enclose the source of electrical or magnetic radiation, thus providing additional protection to sensitive materials in the vicinity of the disturbance.

The novel feature of this invention is the use of a soft iron alloy screen, of close mesh or soft iron foil, inserted and laminated within sheets of fibre board or other suitable packaging material. A carton or box so fabricated will provide a continuous path for the undesirable electrical and magnetic interferences, causing them to flow around the sides, top, and bottom of the container rather than through it. Thus, any item placed in such a container is effectively and permanently protected from electrical and magnetic interference.

A drawing of the invention is included with and made a part of this application.

Figure 1:
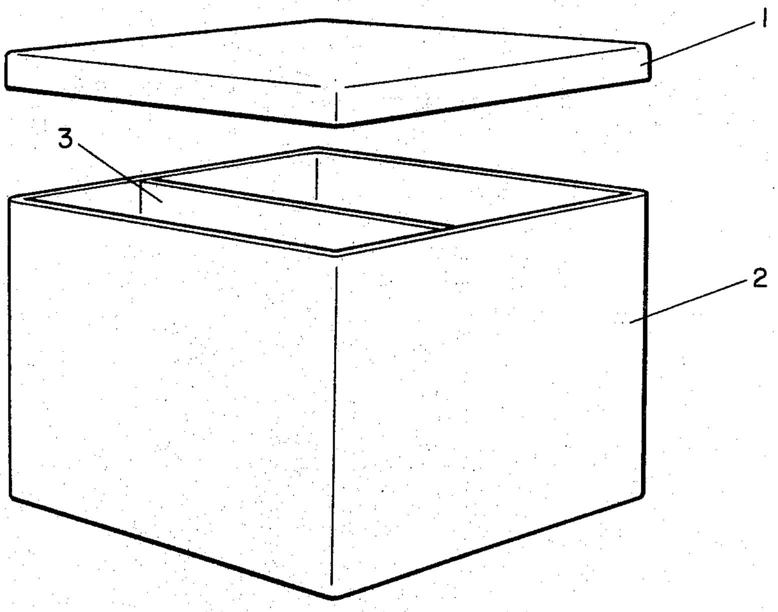
FIG. 1 is a perspective drawing of the container shown with a top (lid) and separator inserted. The separator, made of the same shielding material, is used to eliminate the transfer of magnetic forces between items placed in the same carton.

FIG. 1–(1) is the top or lid, constructed of the same screen or foil shielding material, and is designed to fit snugly over the basic carton (FIG. 1–(2)).

FIG. 1–(2) is the basic container, also fabricated of the shielding material, and is designed to accept separators (FIG. 1–(3)) which divide the carton into compartments for storing the electrically or magnetically sensitive contents and prevent the transfer of magnetic forces between items in the container.

Figure 2:
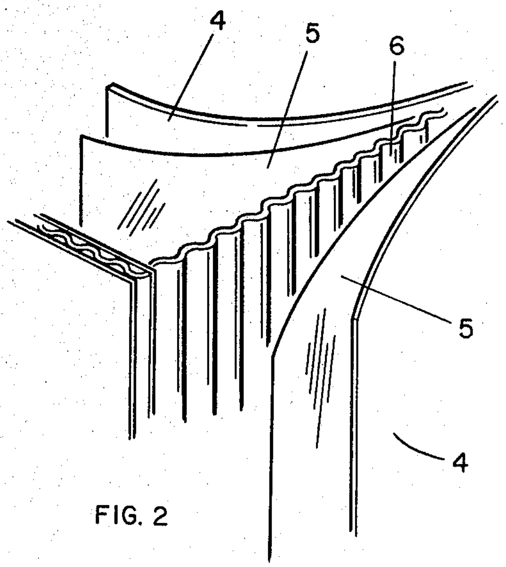
FIG. 2 is an exploded view of construction using fibre board corrugation with the soft iron foil laminated between the inner corrugation and outer paper plys. Additionally, plywood, plastic, fibre glass, sheet metal, or any other material compatible with the foil, can be used to construct the storage carton.

FIG. 2–(4) is the innermost and outermost ply of material and provides a covering for the foil iron alloy FIG. 2–(5)), which is affixed to the corrugated material (FIG. 2–(6)) with a suitable adhesive or bonding agent.

Figure 3:
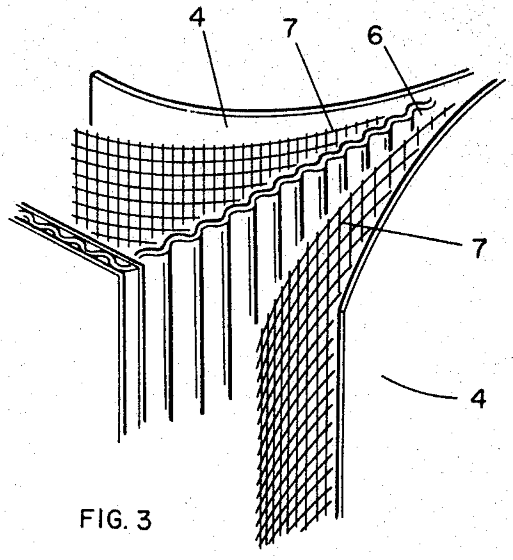
FIG. 3 is an exploded view of the construction using fibre board corrugation with the soft iron alloy screen laminated between the inner corrugation and the outer paper plys. Additionally, plywood, plastic, fibre glass, sheet metal, or any other material compatible with the screen can be used to construct the storage carton.

FIG. 3–(4) is the innermost and outermost ply of material and provides a covering for the iron alloy screen mesh (FIG. 3–(7)), which is affixed to the corrugated center piece (FIG. 3–(6)) with a suitable adhesive or bonding agent.

The laminated screen or foil material will be compressed into flat sheets. The sheets of the shielding material will then be die-stamped, cut, folded, and assembled into boxes, cartons, and containers which will receive the electrically and/or magnetically sensitive items to be protected.

Referring now to the drawings there is shown a magnetically shielded container 2 which comprises in general a box-like hollow body inclusive of bottom and opposing side walls joined to form a storage space with a removable top closure or top wall 1 to close the container and provide access to its interior. Each wall of the container comprises an inner backing layer 6 preferably of corrugated shaping as shown, an intermediate layer 5 (FIG. 2) and 7 (FIG. 3) affixed to and covering each side layer 6 and an outer layer 4 affixed to and covering each intermediate layer and forming the exterior and interior wall surfaces of the container. The intermediate layers are of a foil construction as shown in FIG. 3, and are of a ferromagnetic material such as a soft iron or soft iron alloy which exhibits a large amount of magnetic activity and has a permeability many times greater than that of free space. The inner and outer layer 6 and 4 may be of the materials as above set forth which can be generally classified as non-ferromagnetic materials which have magnetic properties either slightly greater than or less than that of free space.

We claim:

1. A magnetically shielded container for storing magnetically sensitive articles comprising bottom, top, and opposed side walls assembled in abutting relation to form a hollow enclosed storage space, each said wall including an inner corrugated backing layer, an intermediate layer of ferromagnetic material affixed to and covering each side of said inner corrugated backing layer, and an outer layer affixed to and covering said intermediate layers and forming the exterior and interior wear surfaces of the container.

2. A magnetically shielded container as set forth in claim 1 wherein said intermediate layers are of a foil construction.

3. A magnetically shielded container as set forth in claim 1 wherein said intermediate layers are of a screen construction.

4. A magnetically shielded container as set forth in claim 1 wherein said intermediate layers are of a soft iron alloy material.

5. A magnetically shielded container as set forth in claim 1 wherein said inner and outer layers are of a non-ferromagnetic material.

6. A magnetically shielded container for storing magnetically sensitive articles comprising bottom, top, and opposed side walls joined to form a hollow enclosed storage space, each said wall including an inner corrugated backing layer, an intermediate layer of ferromagnetic material affixed to and covering each side of said inner corrugated backing layer, and an outer layer affixed to and covering said intermediate layers and forming the exterior and interior wear surfaces of the container.

7. A container as set forth in claim 6 wherein said container includes a partition extending transversely of two opposed walls and of the same layer structure as said top, bottom, and side walls.

References Cited

UNITED STATES PATENTS

| | | | |
|---|---|---|---|
| 864,775 | 9/1907 | Ferres | 161—137 |
| 2,766,920 | 10/1956 | Rawley | 229—3.5 |
| 2,954,140 | 9/1960 | Sutherland et al. | 217—53 |

JOSEPH R. LECLAIR, *Primary Examiner.*

GEORGE O. RALSTON, *Examiner.*

R. PESHOCK, *Assistant Examiner.*